(12) United States Patent
Mangiagli et al.

(10) Patent No.: US 9,447,871 B2
(45) Date of Patent: Sep. 20, 2016

(54) MULTIPLE-RATIO BOOST VALVE

(71) Applicant: Sonnax Industries, Inc., Bellows Falls, VT (US)

(72) Inventors: Todd V. Mangiagli, Westminister, VT (US); Maura J. Stafford, Warner Robins, GA (US); Donald G. Parrott, Alstead, NH (US)

(73) Assignee: Sonnax Industries, Inc., Bellows Falls, VT (US)

( * ) Notice: Subject to any disclaimer, the term of this patent is extended or adjusted under 35 U.S.C. 154(b) by 133 days.

(21) Appl. No.: 14/548,715

(22) Filed: Nov. 20, 2014

(65) Prior Publication Data

US 2015/0152959 A1     Jun. 4, 2015

Related U.S. Application Data

(60) Provisional application No. 61/906,687, filed on Nov. 20, 2013.

(51) Int. Cl.
| | |
|---|---|
| *F16K 11/065* | (2006.01) |
| *F16K 11/07* | (2006.01) |
| *F15B 13/04* | (2006.01) |
| *F16H 61/02* | (2006.01) |
| *F16K 31/122* | (2006.01) |

(52) U.S. Cl.
CPC ..... *F16H 61/029* (2013.01); *F16H 2061/0279* (2013.01); *F16K 11/07* (2013.01); *F16K 11/0716* (2013.01); *F16K 31/1225* (2013.01); *Y10T 137/0486* (2015.04); *Y10T 137/8671* (2015.04); *Y10T 137/86702* (2015.04); *Y10T 137/87177* (2015.04)

(58) Field of Classification Search
CPC ............... Y10T 137/8671; Y10T 137/86702; Y10T 137/274; Y10T 137/2668; Y10T 137/2663; Y10T 137/2652; Y10T 137/2579; Y10T 137/2574; Y10T 137/2559; Y10T 137/2564; F16H 61/029; F16H 2061/0279; F16K 11/07; F16K 11/0716; F16K 31/1225
USPC ............ 137/625.69, 628.68, 625.25, 625.67, 137/625.6, 111, 109, 115.13, 115.01, 137/118.02, 118.06, 119.01, 127
See application file for complete search history.

(56) References Cited

U.S. PATENT DOCUMENTS

| | | | |
|---|---|---|---|
| 2,973,746 A | * | 3/1961 | Jupa .................... F15B 13/0438 137/625.6 |
| 3,785,614 A | | 1/1974 | Enomoto |

(Continued)

FOREIGN PATENT DOCUMENTS

JP          11132348          5/1999

*Primary Examiner* — Kevin Murphy
*Assistant Examiner* — Kelsey Rohman
(74) *Attorney, Agent, or Firm* — Downs Rachlin Martin PLLC

(57) ABSTRACT

Various devices and methods are provided for a multiple pressure ratio valve assembly that can be used in a plurality of systems requiring different operating pressures. In one embodiment, a multi-pressure ratio valve is provided, the valve having a fluid bypass portion and being configurable into a plurality of pressure ratio configurations by selectively blocking a portion of the fluid bypass such that the pressure ratio of the valve assembly may be varied. Embodiments of the invention may also include a valve sleeve configured for use in a plurality of transmissions, the multi-pressure ratio valve being configured to be slidably disposed within the sleeve.

17 Claims, 7 Drawing Sheets

(56) References Cited

U.S. PATENT DOCUMENTS

| | | |
|---|---|---|
| 3,923,076 A | 12/1975 | Blake |
| 3,983,893 A | 10/1976 | Nubson |
| 4,546,786 A | 10/1985 | Koike |
| 4,667,930 A | 5/1987 | Latimer et al. |
| 4,838,313 A | 6/1989 | Kobayashi et al. |
| 5,282,604 A | 2/1994 | Wade |
| 5,383,812 A | 1/1995 | Tibbles |
| 5,513,673 A | 5/1996 | Slavin et al. |
| 5,772,550 A | 6/1998 | Kamanda et al. |
| 5,868,167 A | 2/1999 | Miki et al. |
| 6,019,011 A | 2/2000 | Monette et al. |
| 6,269,827 B1 | 8/2001 | Potter |
| 7,082,965 B2 | 8/2006 | Homes et al. |
| 7,909,060 B2 | 3/2011 | Yamamoto et al. |
| 2010/0327206 A1* | 12/2010 | Nishimine .......... F16H 61/0021 251/321 |

\* cited by examiner

MULTIPLE-RATIO BOOST VALVE

RELATED APPLICATION DATA

This application is a non-provisional of U.S. Provisional Patent Application Ser. No. 61/906,687, filed on Nov. 20, 2013, and titled "Dual Ratio Boost Valve and Sleeve," which is incorporated by reference herein in its entirety.

FIELD OF THE INVENTION

The present invention generally relates to valve assemblies for controlling pressure in hydraulic systems. In particular, the present invention is directed to valve assemblies adapted to provide different pressure ratios and a method and kit for installing the same.

BACKGROUND

Pressure regulator valves are used in a variety of different applications to regulate the flow rate and pressure of a pressurized fluid. Many pressure regulator valves include a valve with one or more lands disposed within a valve bore. The valve may slide within the valve bore in response to changing system conditions to thereby move the one or more lands relative to openings in the valve body and thereby control a fluid pressure and flow rate. Some systems also include a boost valve that is positioned adjacent the pressure regulator valve, and that can influence the position of the pressure regulator valve, and thus, influence the regulated pressure. A ratio of a pressure regulator valve's input and output fluid pressures can vary depending on the size of both the pressure regulator valve's and boost valve(s)' diameters. The size of the valves and the size of the valve bore in a pressure regulator valve can therefore vary depending on the system pressure the pressure regulator valve is designed for.

A common application for pressure regulator valves and boost valves is automobile automatic transmissions. FIG. 8 illustrates an example prior art transmission pressure regulator valve assembly 800, including pressure regulator valve 802 and boost valve 804 disposed in a bore 805 of valve body 806, the pressure regulator valve assembly being designed to regulate a transmission pressure under varying operating conditions. As shown in FIG. 8, valve assembly 800 also includes a boost sleeve 808 and a spring 810. Valve body 806 has a plurality of fluid ports 812 for coupling to transmission fluid circuits (not shown). In the illustrated example, fluid ports 812 include pressure inputs 814, pressure output 816, pressure reliefs 818, and boost feeds 820 and 822.

Different transmissions might utilize the same or similar valve body, but a different valve train for the pressure regulator. For example, in some instances, a first transmission with a first pressure ratio requirement might utilize valve assembly 800, while a second transmission with a different pressure ratio requirement might have a valve assembly that includes a valve body and pressure regulator valve that are substantially the same as valve body 806 and pressure regulator valve 802, but a different diameter boost valve than boost valve 804. In other examples, further aspects of the valve assembly may differ.

Proper functioning of the valve is critical to the proper functioning of the transmission. Because of the constant movement of the valves within the valve body, however, the valve assembly often wears out and needs to be replaced. A manufacturer that sells replacement pressure regulator valves or boost valves, or kits for replacing valve components, generally must manufacture and sell a plurality of different valves or kits, each corresponding to a particular valve bore diameter and valve land diameters for a particular vehicle.

SUMMARY OF THE DISCLOSURE

In one implementation, the present disclosure is directed to a multi-ratio boost valve assembly configured and dimensioned to be slidably disposed within a bore of a valve body of an automobile transmission in cooperation with a pressure regulator valve. The multi-ratio boost valve assembly includes a boost sleeve configured and dimensioned to be sealingly received in the valve body adjacent the pressure regulator valve with at least one fluid port in mating relationship with a boost feed port of the valve body, said boost sleeve defining a boost sleeve bore with at least first and second different inner diameters; a boost valve configured and dimensioned to be slidably disposed within the boost sleeve bore, said boost valve having; an outer surface including a plurality of lands and at least one intermediate portion extending between adjacent ones of the plurality of lands, the intermediate portion and adjacent lands cooperating with the boost sleeve bore to form an annular cavity therebetween, at least two of said plurality of lands each having an outer diameter corresponding to one of said first and second boost sleeve bore inner diameters; and a fluid bypass extending along at least a portion of said boost valve, the fluid bypass providing fluid access between said at least one fluid port and said annular cavity; and a plug configured and dimensioned for placement in said fluid bypass to thereby block transmission fluid from entering at least a portion of said fluid bypass.

In another implementation, the present disclosure is directed to a multi-ratio boost valve kit for replacing existing boost valves in a plurality of transmissions having different boost valve diameters. The kit includes a replacement boost sleeve configured for placement in a valve body bore of any one of the plurality of transmissions, the boost sleeve having an inner wall with a plurality of inner diameters corresponding to the plurality of different boost valve diameters; a replacement boost valve configured and dimensioned to be slidably disposed within said replacement boost sleeve, said replacement boost valve having; an outer surface including a plurality of lands having outer diameters corresponding to the plurality of different boost valve diameters; and a fluid bypass extending along at least a portion of said boost valve; wherein said replacement boost valve is selectively configurable between at least a first and second configuration by selectively blocking a portion of said fluid bypass, said first and second configurations corresponding to first and second ones of said plurality of transmissions having different boost valve diameters.

In yet another implementation, the present disclosure is directed to a method of replacing an original equipment (OE) boost valve and sleeve of an automobile transmission pressure regulator valve assembly with a multi-ratio boost valve having a plurality of lands and a fluid bypass. The method includes removing the OE boost valve; determining a size of the OE boost valve; selecting one of the plurality of lands having a size that corresponds to the size of the OE boost valve; and configuring the multi-ratio boost valve to activate the selected land such that, when installed, a transmission fluid will act on said selected land and bypass other ones of the plurality of lands.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
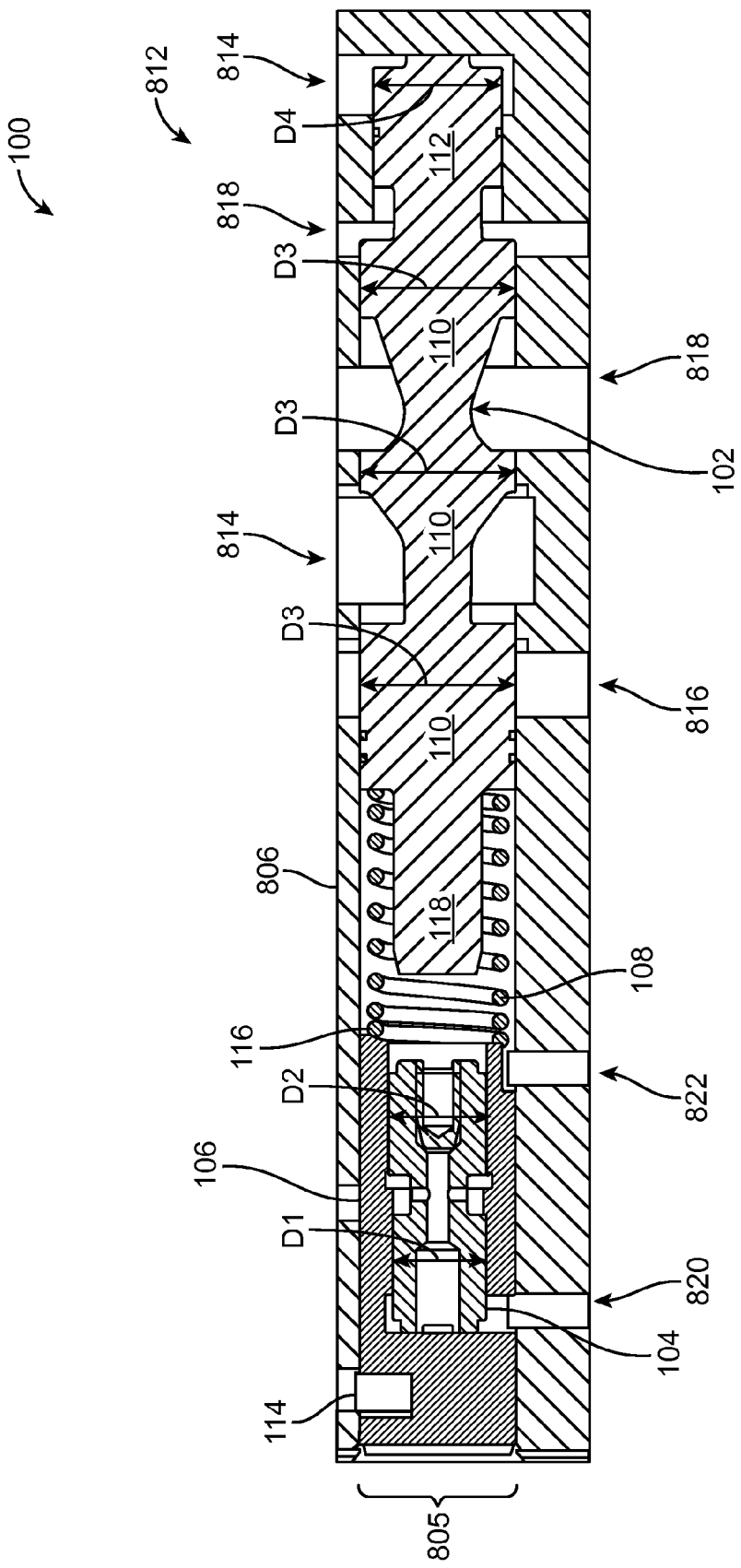
FIG. 1 is a cross sectional view of an example Multiple Pressure Ratio (MPR) Pressure Regulator Valve (PRV) assembly.

Various devices and methods are provided for a multiple pressure ratio valve assembly that can be used in a plurality of systems requiring different operating pressures. In one embodiment, a multi-pressure ratio valve is provided, the valve having a fluid bypass portion and being configurable into a plurality of pressure ratio configurations by selectively blocking a portion of the fluid bypass such that the pressure ratio of the valve assembly may be varied. Embodiments of the invention may also include a valve sleeve configured for use in a plurality of transmissions, the multi-pressure ratio valve being configured to be slidably disposed within the sleeve.

FIGS. 1-7 illustrate an example embodiment of a multiple-pressure ratio (MPR) pressure regulator valve (PRV) assembly 100 including PRV 102, MPR boost valve 104, boost sleeve 106, and spring 108. In the illustrated example, PRV 102 and MPR boost valve 104 are slidably disposed within bore 805 of OE valve body 806 having fluid ports 812. Illustrated valve body 806 and fluid ports 812 are merely shown by way of example. MPR valve embodiments made in accordance with the present invention may be utilized in a variety of other applications, including alternative OE transmission valve trains having different fluid circuits, including, for example, a single boost feed.

Illustrated PRV 102 has four lands, including three lands 110 having a diameter D3 and one land 112 having a diameter D4. Alternative PRVs may have other numbers of lands and different combinations of diameters. Spring 108 disposed between PRV 102 and MPR boost valve 104 is configured to exert a spring force on PRV 102 that counteracts transmission fluid pressure acting on PRV lands 110 and 112 to thereby achieve a desired position of PRV 102 within bore 805 for a given set of pressures at ports 812.

Figure 2:
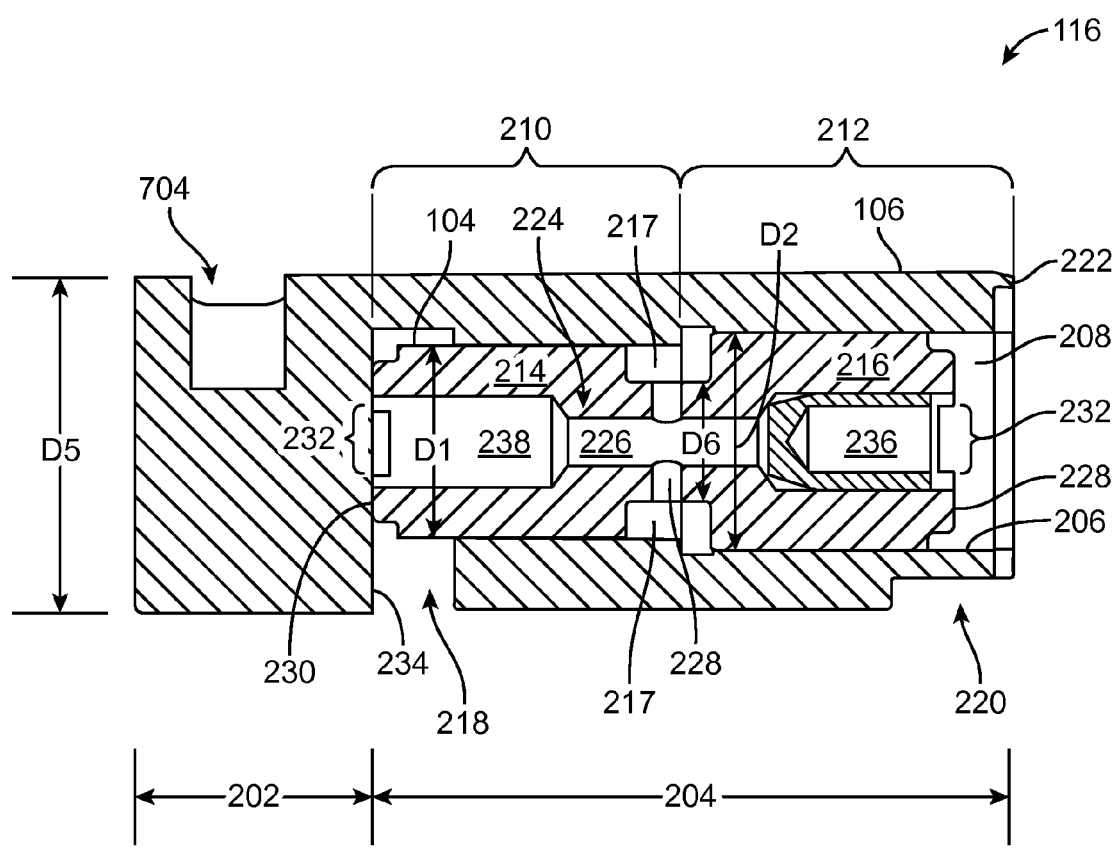
FIG. 2 is a cross sectional view of the MPR boost valve and sleeve of the MPR PRV assembly of FIG. 1.
Figure 7:
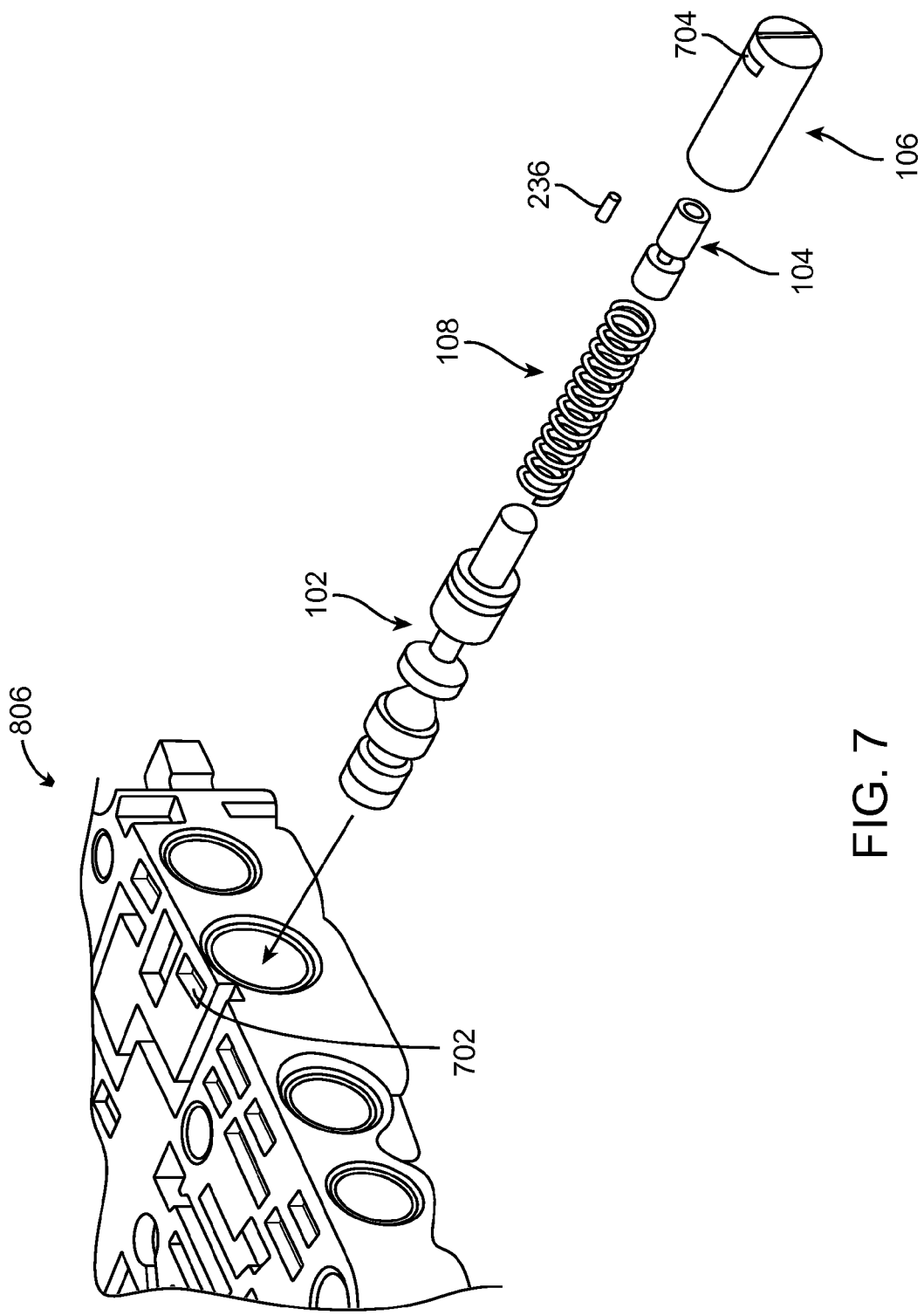
FIG. 7 is an exploded isometric view of the MPR PRV assembly of FIG. 1.

Exemplary boost sleeve 106 is configured and dimensioned for installation within valve bore 805, having a maximum outer diameter D5 (FIG. 2) and is sized and configured for sliding engagement with an inner diameter of valve bore 805. In the illustrated embodiment, sleeve diameter D5 is substantially the same as PRV land diameter D3. Boost sleeve 106 is designed to be fixed within bore 805 by retaining clip 114, which, as best seen in FIG. 7, is designed to be inserted into opening 702 in valve body 806 and inserted into recess 704 (FIGS. 2, 7) in boost sleeve 106. Example boost sleeve 106 includes a retaining clip portion 202 (FIG. 2) and a boost valve portion 204 defining a boost valve bore 208 with an internal wall 206, the bore 208 having a length and internal diameters sufficient to support MPR valve 104. As best seen in FIG. 2, inner wall 206 of boost sleeve 106 includes two sections 210 and 212 having corresponding inner diameters that are dimensioned for sliding engagement with lands 214 and 216 of MPR valve 104. As described more fully below, illustrated diameter D1 is smaller than diameter D2 and may respectively correspond to two different OE boost valves from two different transmissions. In other embodiments, D1 may be larger than D2. Boost sleeve 106 also defines boost feed opening 218 opposite the open end of boost valve bore 208. Boost feed opening 218 is configured to align and communicate with boost feed port 820.

Figure 8:
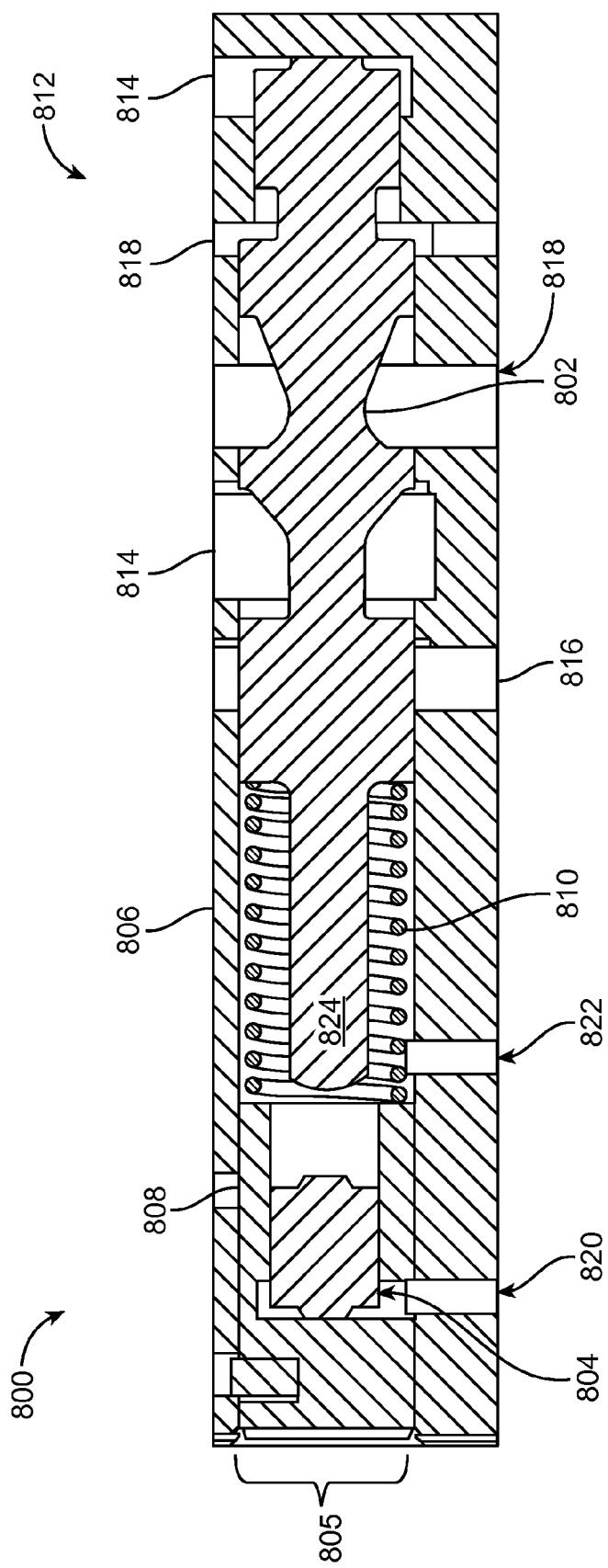
FIG. 8 is a cross sectional view of an example Original Equipment pressure regulator valve assembly.

As shown in FIG. 1, the length of boost sleeve 106 results in end 116 of boost sleeve 106 overlapping feed port 822. As discussed more fully below, boost sleeve 106 may be longer than a comparable OE boost valve sleeve, such as, for example, sleeve 808 (FIG. 8), to accommodate MPR valve 104, which may be longer than a comparable OE boost valve, such as, for example, boost valve 804 (FIG. 8). Illustrated boost sleeve 106 overlaps both boost feed ports 820 and 822. Boost feed opening 218 provides fluid access between boost feed port 820 and boost valve 104 and undercut 220 (FIG. 2) in end 116 provides fluid access between boost feed port 822 and the boost valve. Undercut 220 allows the end of boost sleeve 106 to overlap feed port 822 without preventing fluid flow through the feed port by cooperating with valve body 806 to form a fluid passageway between overlapped boost feed 822 and the boost valve. End 116 of boost sleeve 106 also includes a spring-centering shoulder 222 that is designed and configured to maintain spring 108 in a centrally-located position within bore 805. Spring-centering shoulder 222 may, for example, enable greater flexibility in the design of spring 108 by allowing the incorporation of a smaller-diameter spring with a smaller clearance from an outer surface of MPR valve 104 and extension 118 (FIG. 1) of PRV 102. Spring-centering shoulder 222 can, for example, be configured to maintain a spring having a smaller inner diameter in a central location within valve bore 805 so that a smaller-diameter spring does not move laterally and come into contact with boost valve 104 or extension 118 of PRV 102.

Illustrated MPR boost valve 104 may have a plurality of lands 302 (FIG. 3) with differing outer diameters and surface areas that correspond to the outer diameters and surface areas of a plurality of OE boost valves, the plurality of lands for providing differing pressure ratios. As will be appreciated from reading the entire disclosure, the outer diameters of the plurality of lands 302 may be the same as the outer diameter of respective ones of OE boost valves, or in the case of providing an oversized pressure regulator valve and boost valve replacement, the plurality of lands may be slightly greater than the corresponding OE boost valve diameters. In the illustrated embodiment, MPR boost valve 104 has two lands 214 and 216 having outer diameters D1 and D2 sized for sliding engagement with sections 210 and 212, respectively of boost sleeve 106. In the illustrated example, lands 214 and 216 are spaced from one another and an intermediate portion 304 having an outer diameter D6 extends therebetween. As best seen in FIG. 2, in the illustrated embodiment, D1 is less than D2, and both D1 and D2 are greater than an outer diameter D6 of intermediate portion 304. In other embodiments, D1 may be greater than D2 and sleeve 106 may have an alternative configuration to cooperate and function with such an arrangement. In yet other embodiments, a multiple ratio boost valve may not have an intermediate portion with an outer diameter less than outer diameters of adjacent lands. As shown in FIG. 2, in the illustrated embodiment, lands 214 and 216 and intermediate portion 304 are configured and dimensioned to cooperate with inner wall 206 of valve bore 208 to form annular cavity 217.

MPR valve 104 may also have a fluid bypass 224 that may allow transmission fluid to bypass one or more of lands 214 and 216. In the illustrated example, fluid bypass 224 has a longitudinal portion 226, which, in the illustrated embodiment, extends from a first end 228 to a second end 230 of MPR valve 104 and extends along a central longitudinal axis of the MPR valve. In alternative embodiments, fluid bypass 224 may have a longitudinal portion that extends along less than the entire length of the valve, may include two separate longitudinal portions extending across respective lands of the valve, may be offset from a central longitudinal axis of the valve, or may be non-parallel to a central longitudinal axis of the valve. For example, in embodiments where MPR PRV assembly is designed to replace OE valves having only one boost feed, for example only a feed port corresponding to port 820 instead of having two feed ports 820 and 822, the MPR may have a central longitudinal portion that does not extend across an entire length of the MPR boost valve and may, for example, only extend along a longitudinal portion of the valve adjacent to the boost feed, such as from an end of the valve adjacent the feed port to an intermediate portion between adjacent lands. For example, if an MPR designed for a valve with a single boost feed has two lands, it may include a fluid bypass with a longitudinal portion that only extends across the land adjacent the single boost feed port and that does not extend across the other land of the MPR valve. An example valve for installation in a single boost feed valve bore may have a first configuration where a plug is installed in the fluid bypass to activate the land adjacent the boost feed port, and may have a second configuration where no plug is installed to thereby provide fluid communication to a land that is not adjacent the feed port and allow transmission fluid to bypass the land adjacent the feed port.

Figure 3:
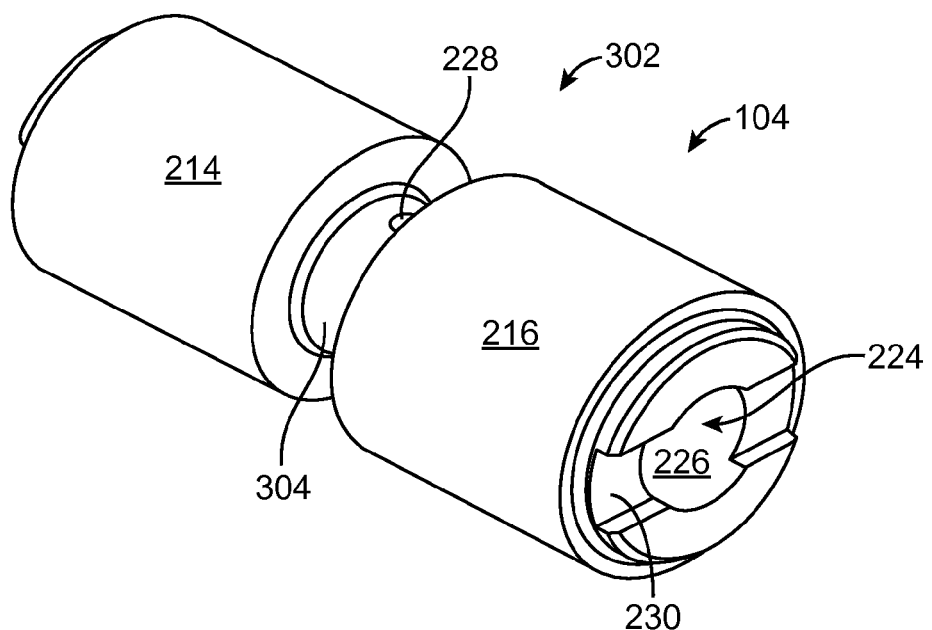
FIG. 3 is an isometric view of the MPR boost valve of FIGS. 1 and 2.
Figure 4:
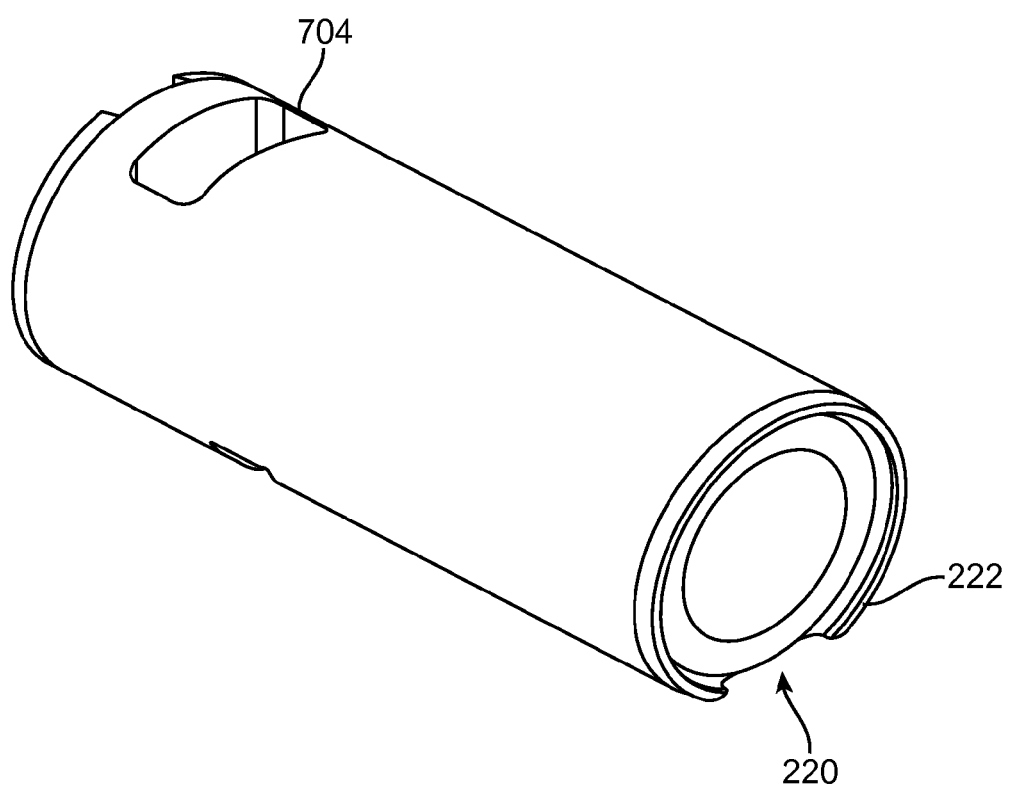
FIG. 4 is an isometric view of the MPR boost sleeve of FIGS. 1 and 2.

Illustrated fluid bypass 224 also has a transverse portion 228. In the example shown, transverse portion 228 intersects longitudinal portion 226, extends across an entire width of intermediate portion 304 of valve 104, and is substantially perpendicular to a central longitudinal axis of the valve. Thus, as described more fully below, longitudinal and transverse portions 226 and 228 may cooperate to route transmission fluid past one of lands 214 or 216 to annular cavity 217 located between the two lands. In alternative embodiments, an MPC valve may have a fluid bypass with a transverse portion that does not extend across an entire width of the valve, or that is non-perpendicular to a central longitudinal axis of the valve. As best seen in FIGS. 2, and 3, MPC valve 104 may also have a slot 230 in each end of the valve. In the illustrated example, slots 230 maintain a fluid passageway from boost feed ports 820, 822 to fluid bypass 224 even when ends 228 or 230 of MPR boost valve 104 are in direct contact with either wall 234 of boost sleeve 106 or protrusion 118 of PRV 102.

As shown in FIG. 2, MPR valve 104 may also include plug 236 configured and dimensioned for insertion into a portion of fluid bypass 224, to thereby block transmission fluid from entering at least a portion of the fluid bypass. In the illustrated example, longitudinal portion 226 of fluid bypass 224 includes two plug cavities 238 (only land 214 cavity labeled to avoid clutter), each cavity may have substantially the same inner diameter, and the inner diameter may be greater than an intermediate portion of the longitudinal portion 226 of bypass 224. In one example both plug cavities 238 may have substantially the same inner diameter and a single plug 236 may be inserted into either cavity. Plug 236 and MPR valve 104 can have a variety of configurations for coupling or seating the plug in a respective plug cavity 238. For example, the plug 236 and cavities 238 can have a press fit or interference fit, and the dimensions for the components can have a tight tolerance to ensure a secure press fit. A press fit may enable ease of installation of plug 236 in a respective cavity 238, while providing enough resistance to fluid pressures to remain seated in valve 104. The sizing and material selection of valve 104 and plug 236 may be selected such that diameters D1 and D2 of lands 214 and 216 do not expand when plug 236 is pressed into respective cavity 238, which could be detrimental to the valve/sleeve fit and function. In alternative embodiments, MPR valves may have plug cavities and corresponding plugs with additional mating features, such as a threaded fit, or the plug may have one or more male and/or female features that are sized and configured to mate with a respective male or female feature in a cavity of a MPR land to improve plug retention and seal. In addition, one or more seals may be added to further improve the fluid seal between the plug and diameter.

The MPR PRV assemblies disclosed herein may be designed and configured to replace a first OE PRV assembly, such as OE PRV assembly 800, as well as a second OE PRV assembly having, for example, the same pressure regulator valve diameters but different boost valve diameters. In the example embodiments disclosed, MPR PRV assembly 100 is designed to replace OE PRV assemblies having substantially the same valve bore diameter and PRV land diameters, but different boost valve diameters. By way of non-limiting example, Toyota/Lexus transmission model numbers U660E, U660F, U760E, and U760F have such a relationship, where both have the same PRV, but the U660 E/F models have a larger-diameter boost valve than the U760E/F models. As described more fully below, embodiments of the present invention may be utilized to provide a single PRV and boost valve replacement kit that may be used to replace the PRV and boost valve in any of transmissions U660E, U660F, U760E, or U760F.

In the illustrated embodiments, a comparison of example OE PRV assembly 800 (FIG. 8) to exemplary MPR PRV assembly 100, which in this example, are both installed in the same OE valve body 806, shows that MPR boost valve 104 and boost sleeve 106 are longer than OE boost valve 804 and sleeve 808. In this example, to accommodate the size differences within the OE valve body while maintaining the proper pressure ratio performance of the valve, extension 118 on PRV 102 is shorter than extension 824 on OE PRV 802, and spring 108 has a different configuration than OE spring 810 to ensure replacement MPR PRV assembly 100 performs correctly. In the illustrated example, these differences include spring 108 having a shorter length and smaller diameter than OE spring 810. As discussed above, in the illustrated example, spring centering shoulder 222 may facilitate, for example, reducing the inner diameter or varying the diameter of the wire used to form spring 108 by maintaining the spring in a centrally-located position and preventing boost valve 104 or PRV 102 from inadvertently contacting the smaller-diameter spring.

Figure 5:
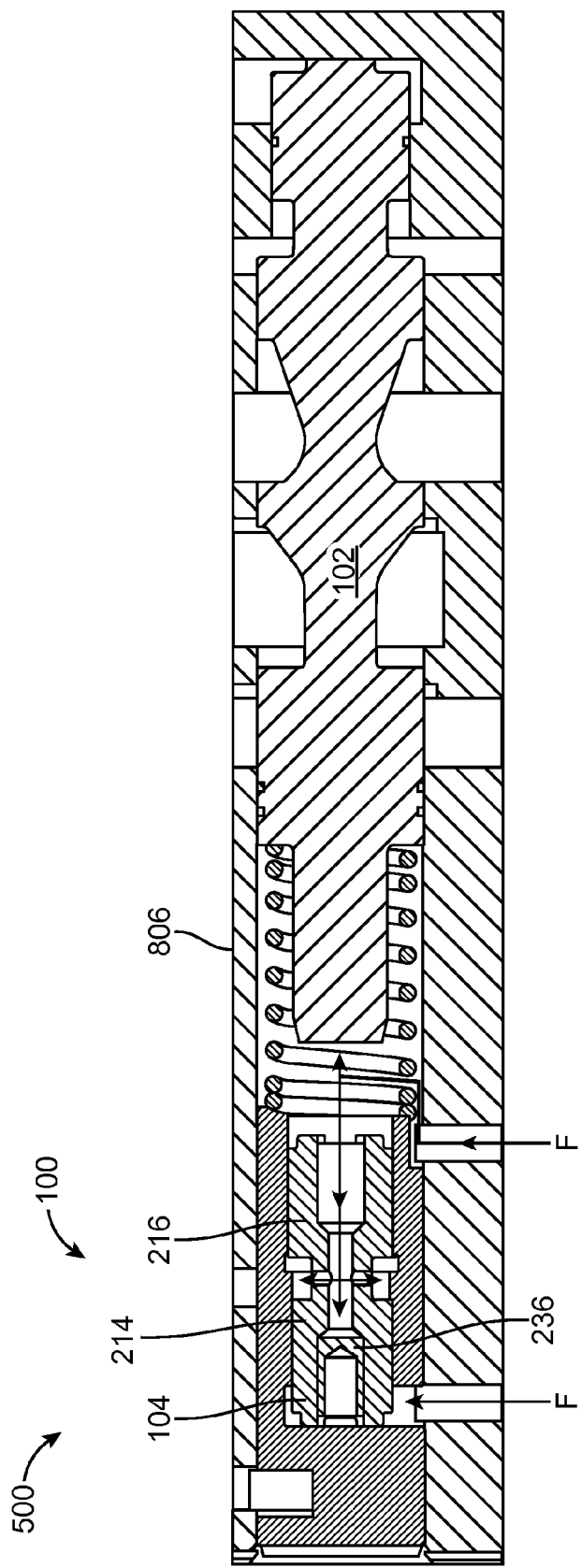
FIG. 5 is a cross sectional view of the MPR PRV assembly of FIG. 1 in a first configuration.
Figure 6:
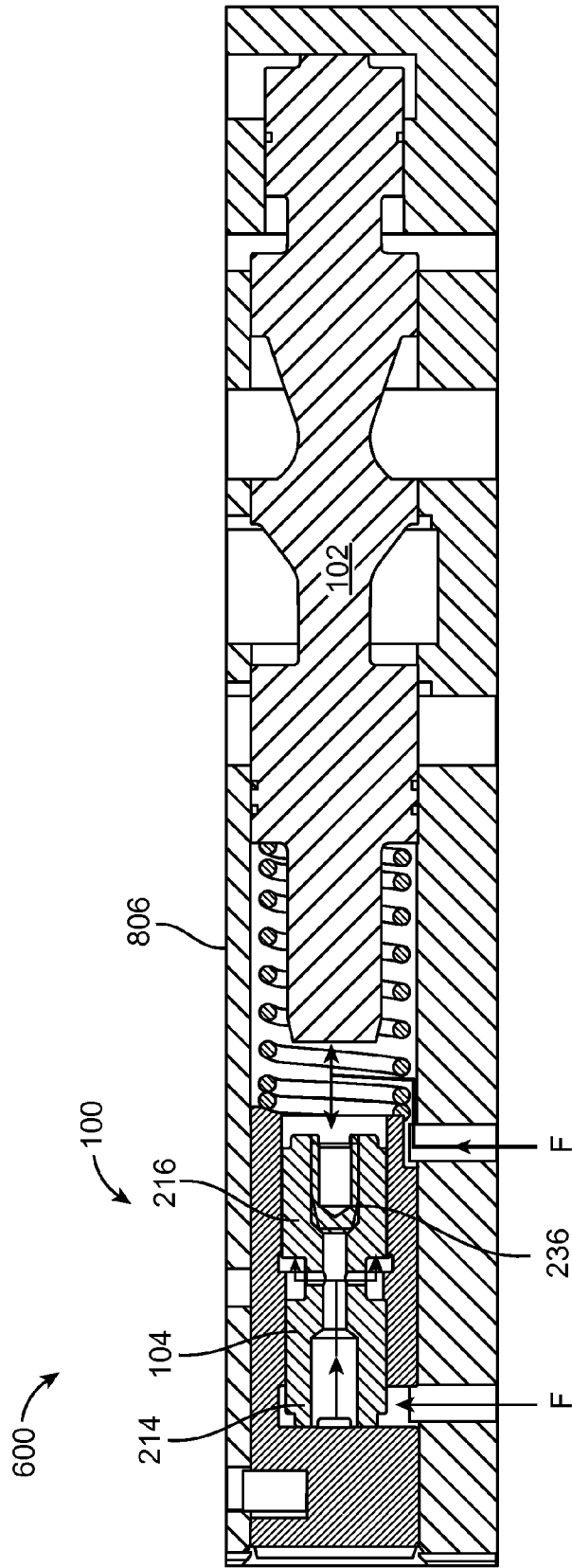
FIG. 6 is a cross sectional view of the MPR PRV assembly of FIG. 1 in a second configuration.

In use, embodiments of the MPR valve assemblies disclosed herein may be used to provide a kit that can be used to replace an OE PRV assembly. FIG. 7 is an exploded view of components of an example replacement kit for forming MPR valve assembly 100, which may include PRV 102, spring 108, boost valve 104, plug 236, and boost sleeve 106. In the illustrated example, and as described above, plug 236 may be installed in either end 228 or 230 (FIG. 2) of boost valve 104, depending on the OE valve being replaced. By way of non-limiting example, FIG. 5 illustrates MPR PRV assembly 100 in a first configuration installed in a first transmission 500 requiring a first pressure ratio, and FIG. 6 illustrates MPR PRV assembly 100 in a second configuration installed in a second transmission 600 requiring a second pressure ratio that is different from the first pressure ratio. In the illustrated example, transmissions 500 and 600 have substantially the same valve body 806 and PRVs with substantially the same diameter lands, but they achieve different pressure ratios by having different diameter boost valves. Thus, in the illustrated example PRV 102 may be used to replace an OE PRV in both transmissions 500 and 600 and the PRV may have lands with substantially the same diameter as the OE PRV lands, such as, for example, OE PRV 802. Diameter D1 of land 214 of MPR boost valve 104 may be substantially the same as the outer diameter of transmissions 500's OE boost valve, which may be similar to, for example, OE boost valve 804. As will be appreciated, in the case of providing an oversized replacement valve, where each of the land diameters of the replacement valves are larger than the OE valves being replaced, such that the valve bore may be machined while still providing a replacement valve with the same pressure ratio as OE, PRV 102 and MPR boost valve 104 may have lands that are slightly larger than the OE PRV and boost valve lands being replaced. Thus, when the present disclosure refers to a boost valve having a plurality of lands with outer diameters that correspond to outer diameters of boost valves being replaced, such a description includes both a "drop-in" replacement where the replacement valve diameter is substantially the same as the valve being replaced, and an "oversized" replacement, where the replacement valve diameter is slightly larger than the valve being replaced.

In the example shown in FIG. 5, MPR boost valve 104 is configured in the first configuration by inserting plug 236 in land 214, thereby activating land 214 which, in the case of a drop in replacement, is substantially the same as the diameter of the boost valve being replaced, or in the case of an oversized valve replacement, would be slightly larger. As shown by the fluid flow arrows F, installing plug 236 in land 214 prevents transmission fluid from bypassing land 214 while allowing transmission fluid to bypass land 216. Thus, in configuration 1, MPR PRV assembly 100 may be configured to have the same pressure response as the transmission 500 OE PRV assembly.

In the example shown in FIG. 6, the OE boost valve from transmission 600 being replaced (not shown) had a larger diameter than the OE boost valve in transmission 500, and diameter D2 of MPR boost valve 104 may be, in the case of a drop in replacement, substantially the same as the transmission 600 OE boost valve diameter, or in the case of an oversized replacement, slightly larger. Thus, MPR boost valve 104 may be configured in the second configuration by inserting plug 236 in cavity 238 of land 216, thereby activating the land having diameter D2. As shown by the fluid flow arrows F, this prevents transmission fluid from bypassing land 216 while allowing transmission fluid to bypass land 214. Thus, in configuration 2, MPR PRV assembly 100 may be configured to have the same pressure response as the transmission 600 OE PRV assembly.

Thus, as illustrated by FIGS. 5 and 6, embodiments of MPR boost valves disclosed herein may be used in a kit to replace OE PRV and boost valve line ups in a plurality of transmissions having different PRV pressure ratios. In one example, an OE transmission may be part of a series of transmissions having the same valve body and PRV, but having different-sized boost valves. In one example, it may be difficult for a person of ordinary skill in the art desiring to replace the OE PRV assembly to know which boost valve the OE transmission has until after the transmission has been disassembled. Thus, in one example embodiment, an MPR PRV kit may be used to replace a OE PRV and boost valve in any one of the plurality of transmissions without needing to know in advance which one of the plurality of OE boost valves a given transmission has. A single MPR boost valve kit may be selected that corresponds to the plurality of transmissions, the transmission may be disassembled and the particular OE boost valve determined by, for example, measuring the outer diameter of the boost valve, or inspecting markings on the valve. For example, in some cases, the presence or absence of a groove on an outer surface of the OE boost sleeve being replaced may indicate the size of the boost valve. After determining the size of the OE boost valve being replaced, the MPR boost valve may be selectively configured by, for example, selectively blocking a fluid passageway of the MPR valve to activate the appropriate MPR valve land. For example, the fluid passageway may be blocked by inserting a plug in a portion of the fluid passageway formed in a land of the MPR valve having the same outer diameter and/or surface area of the OE boost valve being replaced. The selectively configured MPR valve may then be installed in the transmission for use as a replacement boost valve.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A multi-ratio boost valve assembly configured and dimensioned to be slidably disposed within a bore of a valve body of an automobile transmission in cooperation with a pressure regulator valve, the multi-ratio boost valve assembly comprising:
   a boost sleeve configured and dimensioned to be sealingly received in the valve body adjacent the pressure regulator valve with at least one fluid port in mating relationship with a boost feed port of the valve body, said boost sleeve defining a boost sleeve bore with at least first and second different inner diameters;
   a boost valve configured and dimensioned to be slidably disposed within the boost sleeve bore, said boost valve having;
      an outer surface including a plurality of lands and at least one intermediate portion extending between adjacent ones of the plurality of lands, the intermediate portion and adjacent lands cooperating with the boost sleeve bore to form an annular cavity therebetween, at least two of said plurality of lands each having an outer diameter corresponding to one of said first and second boost sleeve bore inner diameters; and a fluid bypass extending along at least a portion of said boost valve, the fluid bypass providing fluid access between said at least one fluid port and said annular cavity; and a plug configured and dimensioned for placement in said fluid bypass to thereby block transmission fluid from entering at least a portion of said fluid bypass.

2. A multi-ratio boost valve according to claim 1, wherein the fluid bypass includes a longitudinal portion and a transverse portion, said transverse portion being in fluid communication with said longitudinal portion and said annular cavity.

3. A multi-ratio boost valve according to claim 2, wherein said transverse portion extends across an entire width of said valve.

4. A multi-ratio boost valve according to claim 2, wherein said valve has a first end and a second end, and wherein said longitudinal portion includes a fluid passageway extending between said first end and said second end.

5. A multi-ratio boost valve according to claim 4, wherein an inner diameter of said fluid passageway at said first end is substantially the same as an inner diameter of said fluid passageway at said second end.

6. A multi-ratio boost valve according to claim 4, wherein said multi-ratio boost valve is selectively configurable between at least a first and second configuration for providing first and second pressure regulator valve pressure ratios, said first configuration comprising said plug being positioned in said fluid passageway at said first end of said valve, and said second configuration comprising said plug being positioned in said fluid passageway at said second end of said valve.

7. A multi-ratio boost valve according to claim 1, wherein said boost sleeve is configured and dimensioned to be positioned in the valve body between two valve body boost feed ports, said boost sleeve being configured to overlap both of said boost feed ports.

8. A multi-ratio boost valve according to claim 7, wherein said boost sleeve includes an undercut configured and dimensioned to cooperate with said valve body to form a fluid passageway between one of said overlapped boost feed ports and said boost valve.

9. A multi-ratio boost valve according to claim 1, wherein said boost sleeve has a spring-centering shoulder configured and dimensioned to position a spring in a centrally-located position within the valve body bore.

10. A multi-ratio boost valve according to claim 1, wherein said boost sleeve is configured for placement in the valve body of at least two different transmissions, the two different transmissions having substantially the same valve body bore diameter and different pressure regulator boost valve pressure ratios.

11. A multi-ratio boost valve according to claim 10, wherein said first boost sleeve inner diameter corresponds to a boost valve outer diameter of one of the at least two different transmissions, and said second boost sleeve inner diameter corresponds to a boost valve outer diameter of another one of the at least two different transmissions.

12. A multi-ratio boost valve kit for replacing existing boost valves in a plurality of transmissions having different boost valve diameters, the kit comprising;

a replacement boost sleeve configured for placement in a valve body bore of any one of the plurality of transmissions, the boost sleeve having an inner wall with a plurality of inner diameters corresponding to the plurality of different boost valve diameters;

a replacement boost valve configured and dimensioned to be slidably disposed within said replacement boost sleeve, said replacement boost valve having;

an outer surface including a plurality of lands having outer diameters corresponding to the plurality of different boost valve diameters; and a fluid bypass extending along at least a portion of said boost valve;

wherein said replacement boost valve is selectively configurable between at least a first and second configuration by selectively blocking a portion of said fluid bypass, said first and second configurations corresponding to first and second ones of said plurality of transmissions having different boost valve diameters.

13. A kit according to claim 12, further comprising a plug configured and dimensioned for placement in said fluid bypass to thereby block transmission fluid from entering at least a portion of said fluid bypass.

14. A kit according to claim 13, wherein said first configuration comprises said plug being positioned in a first portion of said fluid bypass and said second configuration comprises said plug being positioned in a second portion of said fluid bypass.

15. A kit according to claim 13, further comprising a replacement pressure regulator valve and a replacement spring configured and dimensioned for installation with said replacement boost sleeve, replacement boost valve, and plug in the valve body bore of any one of the plurality of transmissions.

16. A kit according to claim 12, wherein the fluid bypass includes a longitudinal portion and a transverse portion, said transverse portion being in fluid communication with said longitudinal portion and an outer surface of said replacement boost valve.

17. A kit according to claim 16, wherein said replacement boost valve has a first end and a second end, and wherein said longitudinal portion includes a fluid passageway extending between said first end and said second end.

* * * * *